July 17, 1973 E. PAMMER ET AL 3,746,569
SILICON NITRIDE COATING ON QUARTZ WALLS FOR DIFFUSION AND OXIDATION REACTORS
Filed Nov. 10, 1970
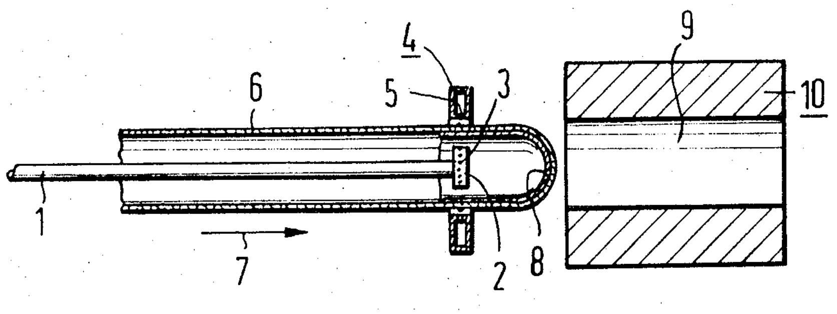

3,746,569

SILICON NITRIDE COATING ON QUARTZ WALLS FOR DIFFUSION AND OXIDATION REACTORS

Erich Pammer and Eduard Folkmann, Munich, Germany, assignors to Siemens Aktiengesellschaft, Munich and Berlin, Germany Filed Nov. 10, 1970, Ser. No. 88,390
Claims priority, application Germany, Nov. 18, 1969, P 19 57 952.3
Int. Cl. B44d 1/12
U.S. Cl. 117—97 8 Claims

ABSTRACT OF THE DISCLOSURE

A quartz tube for oxidation and reduction processes. The quartz tube has on its inner wall a passivating layer which is at least partially comprised of silicon nitride. The passivating layer is applied through pyrolysis of its respective compound.

Our invention relates to a quartz tube for diffusion and oxidation processes of semiconductor crystals.

In the interest of purification, it is customary to carry out work processes in quartz containers. This is particularly true for the diffusion and oxidation processes, which are important for the planar technology, and which must be executed on crystal wafers containing a plurality of semiconductor components. Even when quartz vessels are used, despite a careful selection of the quartz used for producing such vessels, it cannot be avoided that traces of impurities reach the reaction gases, particularly when higher temperatures are required.

Alkali ions which diffuse out of the quartz walls at elevated temperatures, result in instabilities of the $SiO_2$ masking and insulating layers to be produced in the semiconductor systems. Up to now, it was possible to avoid these effects only by cooling the reactor walls. The heating of the semiconductor crystals, in this case, could only be effected through high frequency.

An article by Franz and Langheinrich titled Distribution of Sodium in Silicon Nitride in the periodical "Solid State Electronics" (1969), vol. 12, pp. 145–150, makes it known that silicon nitride layers prevent the instabilities due to their gettering qualities. Therefore, such silicon nitride layers are employed in semiconductor technique as passivating layers.

The present invention utilizes this knowledge and the fact that a quartz tube is being used for diffusion and oxidation processes in semiconductor crystals. According to our invention, this quartz tube has on its inside wall a passivating layer which is at least partially comprised of silicon nitride and is applied through pyrolysis of the respective compound.

It is within the scope of the invention to use passivating layers, which consist of a mixed structure of silicon nitride and silicon carbide. The passivation of quartz tubes with silicon nitride, prior to the diffusion or oxidation processes, makes it possible to omit the cooling of a tubular wall thereby allowing heating from the outside, for example, by a tubular furnace. An additional advantage is gained from the employment of quartz tubes which are easier to process than the difficult to obtain silicon nitride tubes.

A variation of the reaction gas and subsequent tempering processes make it possible to obtain not only silicon nitride layers of various structure and stoichiometry, but also mixed structures such as, e.g. silicon nitride/silicon carbide.

Thus, according to one embodiment of the invention, a passivating layer of silicon nitride is produced by subjecting a quartz tube, at 800 to 900° C., to a gaseous atmosphere, which contains, in addition to nitrogen, silane and ammonia. Subsequently thereto, the silicon nitride layer formed through pyrolysis on the inner wall, is subjected to tempering at 1200° C. The ratio of silane ($SiH_4$) to ammonia ($NH_3$) is 1:10.

It is equally possible to admix methane, silane and ammonia to a reaction gas of nitrogen. Moreover, to produce the passivating layers, Si-N-C compounds, such as for example, tetrakisdimethylaminosilane or triethylaminosilane may be thermally added. Another embodiment is to mix silicon halide and carbon halide with ammonia.

It was found particularly preferable, prior to coating, to rinse the quartz tube for 20 minutes with dry nitrogen absolutely free of air and moisture.

The passivating layer may also be produced by filling the quartz tube which is to be coated, with a mixture comprising silane/ammonia/methane/nitrogen and heating the same in a closed state with a high frequency or resistance heater to 1000 to 1200° C. In this connection, however, it is necessary to provide the tube with a pressure safety valve since considerable volumes of hydrogen are produced during the conversion of the hydrides into silicon nitride or silicon carbide.

Used for coating the quartz tube of the present invention is a device comprising an inlet tube for the gas mixture, one end of the inlet is provided with a radially outward pointing nozzle ring and an annular burner is arranged opposite said nozzle ring. The burner's nozzles point radially inward and have an inner diameter adjusted to the diameter of the quartz tube, to be coated. A tubular furnace is provided for the subsequent tempering processes and connected to the afore-described device.

Other details of the method for applying the passivating layer at the inner wall of the quartz tube and of the device provided thereto, are disclosed in the following embodiment, with reference to the drawing:

The figure schematically illustrates an apparatus suitable for coating the tube with silicon nitride. The inlet tube 1, for the reaction mixture provided with thermal dissociation, is provided at one of its ends 2 with a radially outward pointing nozzle ring 3. Opposite the latter is situated an annular burner 4, whose nozzles 5 point inward and whose inside diameter depends on the diameter of the quartz tube to be coated.

The quartz tube 6, to be coated, is pushed across the inlet tube 1 and rinsed absolutely free of air and moisture for 20 minutes, with dry nitrogen. The annular burner is now ignited and the quartz tube 6 is brought to a temperature of 800 to 900° C. Silane and ammonia are then added to the nitrogen, at a ratio of 1:10. Following the thermal dissociation of the reaction gases escaping through the nozzles 3, a layer of silicon nitride 8 is precipitated at the tubular wall. The tube is now slowly shifted in arrow direction 7, whereby the manual or machine speed is selected so that a coherent and uniform film 8 results. As a result of the shifting, the already coated portions 8 of the quartz tube 6, migrate into the zone 9 (heated to 1200° C.) of a tubular furnace 10, wherein the layer 8 is subjected to an additional tempering. If the quartz tube 6 is coated over the entire desired length, with the silicon nitride layer 8, then the burner 4 and the silane supply are discontinued and the quartz tube 6 is pushed so far into the tubular furnace 10, that the entire coated zone is exposed to a temperature of 1200° C.

After a 10 minute period, the supply of ammonia is stopped and after another 10 minutes, the quartz tube 6 is slowly removed from the tubular furnace 10.

We claim:

1. A process for making a quartz tube for oxidation and reduction processes, said quartz tube having on its inner wall a passivating layer which is a mixed structure of silicon nitride and silicon carbide, which comprises subjecting a quartz tube to a gaseous atmosphere, which in addition to nitrogen contains silane, methane and ammonia, at a temperature of 800 to 900° C. and thereafter tempering the mixed silicon nitride and silicon carbide layer formed by pyrolysis at 1200° C.

2. The process of claim 1, wherein the ratio of silane to ammonia is 1:10.

3. The process for making a quartz tube for oxidation and reduction processes, said quartz tube having on its inner wall a passivating layer which is at least partially comprised of silicon nitride, which comprises subjecting a quartz tube to a gaseous atmosphere, which contains a silicon-nitrogen-carbon compound, at a temperature of 800 to 900° C. and thereafter tempering the silicon nitride layer formed by pyrolysis, at 1200° C.

4. The process of claim 3, wherein the silicon-nitrogen-carbon compound is tetrakisdimethylaminosilane.

5. The process of claim 3, wherein the silicon-nitrogen-carbon compound is triethylaminosilane.

6. A process for making a quartz tube for oxidation and reduction processes, said quartz tube having on its inner wall a passivating layer which is at least partially comprised of silicon nitride which comprises subjecting a quartz tube to a gaseous atmosphere, which in addition to nitrogen, contains ammonia, silicon halide and carbon halide, at a temperature of 800 to 900° C. and thereafter tempering the silicon nitride layer formed by pyrolysis, at 1200° C.

7. The process of claim 1, wherein the quartz tube is preliminarily rinsed for 20 minutes with dry nitrogen.

8. The process of claim 1, wherein the quartz tube is filled with a mixture of silane, ammonia, methane and is heated in a closed state, to a temperature of 1000 to 1200° C.

References Cited

UNITED STATES PATENTS

| | | | |
|---|---|---|---|
| 3,178,308 | 4/1965 | Oxler et al. | 117—107 X |
| 3,356,618 | 12/1967 | Authur et al. | 252—478 |
| 3,101,257 | 8/1963 | Hagen et al. | 117—DIG. 12 |
| 3,200,015 | 8/1965 | Kuntz | 117—DIG. 12 |
| 3,386,866 | 6/1968 | Ebert et al. | 117—105 C |
| 3,520,722 | 7/1970 | Scott | 117—DIG. 12 |
| 3,576,685 | 4/1971 | Swann et al. | 117—DIG. 12 |

EDWIN G. WHITBY, Primary Examiner

U.S. Cl. X.R.

117—229, 106 A, 106 C, DIG. 12; 118—48